May 9, 1944.  W. H. ROSE  2,348,420

LIQUID SPRAYING DEVICE

Filed June 10, 1942  2 Sheets-Sheet 1

INVENTOR.
William H. Rose
BY
his ATTORNEY

Patented May 9, 1944

2,348,420

UNITED STATES PATENT OFFICE 2,348,420

LIQUID SPRAYING DEVICE

William H. Rose, Jersey City, N. J.

Application June 10, 1942, Serial No. 446,420

10 Claims. (Cl. 299—88)

My invention relates to spraying devices and refers particularly to liquid spraying devices in which a supply of liquid is contained within the device by means of liquid-absorbent material.

Attempts have been made to produce satisfactory spraying devices of the above-mentioned general construction, but difficulty has been experienced in preventing the liquid-absorbent material from blocking, or reducing, the air passage necessary for spraying purposes, thus rendering the device inoperative or of uncertain and reduced effectiveness.

In devices of this character it is essential that a maximum amount of liquid be capable of absorption and that a free passage of air be possible through the device in order that sufficient force may be given it to take up the proper amount of liquid and eject it in the form of a fine spray.

If the liquid-absorbent material be so loosely packed as to allow of the free flow of air therethrough, so little liquid is present in the device as to render it useless after a few spraying movements; while if it be too tightly packed the proper flow of air is impossible.

Further, if it is loosely packed, it has a tendency to clog the air passage, and if too tightly packed, the air will flow so freely through the passage as not to pick up and carry with it sufficient liquid.

I have overcome these objectionable properties of devices of this character by having the air passage contain loosely arranged liquid-absorbent material, which will not pack, or clog, but will always remain in its original condition of allowing free air passage therethrough, said loose material being in contact with a more dense mass of liquid-absorbent material capable of containing a maximum of liquid, the loose material acting as a support to prevent the densely packed material from clogging the air passage.

The novelty and advantages of the devices of my invention will be evident upon a consideration of my specification and its accompanying drawings.

In the accompanying drawings illustrating modified forms of the devices of my invention, similar parts are designated by similar numerals.

Figure 1:
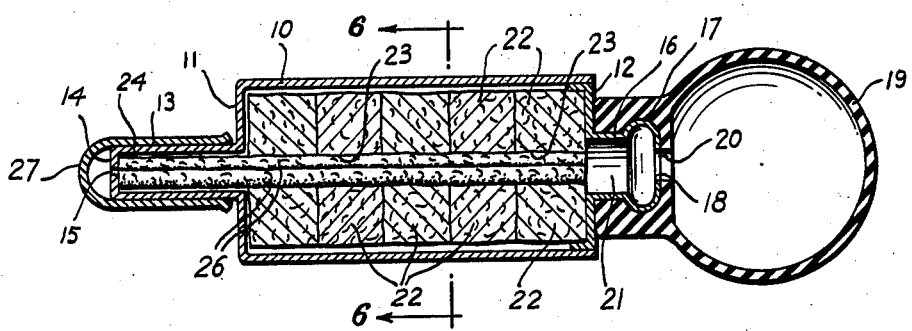
Figure 1 is a vertical longitudinal section of one form of a device of my invention.
Figure 6:
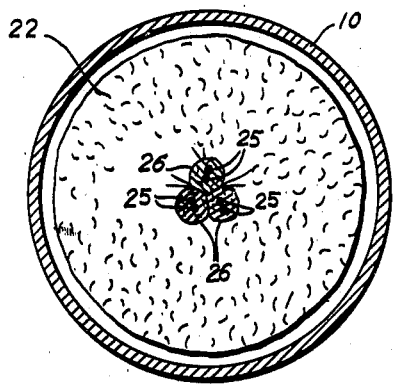
Figure 6 is a section through the lines 6—6 of Figure 1.

The particular form of a device of my invention shown in Figures 1 and 6, comprises an exterior annular casing having the side member 10 and the two end members 11 and 12. The end member 11 has the outwardly extended tubular member 13, the end member 14 of which has a small opening 15 therein. The end member 12 has the outwardly extended tubular member 16 having the bulbous expansion portion 17, and an opening 18. A compressible rubber ball-shaped member 19 is removably attached to the members 12, 17, as shown, the compressible member 19 having an opening 20 in alignment with the passage 21 within the members 12, 17.

Positioned within the casing 10 is a plurality of annual members 22, 22 composed of liquid-absorbent material, each having a centrally positioned opening 23, these openings 23, 23 being positioned in alignment with each other to form a passage therethrough in alignment with the passage 21 of the end member 16 and the passage 24 in the end member 13.

Figure 5:
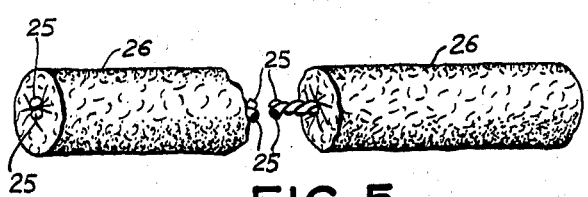
Figure 5 is a perspective view, broken away, of one form of a liquid-absorbent element of my device.

Removably positioned within the passage 23 of the liquid-absorbent disks 22, 22 and the passage 24 of the end member 13 is an elongated liquid-carrying element composed of three elements each consisting of two twisted wires 25, 25 carrying a liquid-absorbent material 26, as shown in Figure 5, the liquid-absorbent material 26 being in contact with the liquid-absorbent material 22.

A removable cap 27 is adopted to close the end 13 of the device when it is not in operative use.

The device is operated as follows:

The liquid-absorbent materials 22 and 26 are saturated with the desired liquid, which can be accomplished in several ways. The compressible member 19 may be removed and the liquid poured slowly through the passage 21 of the end member 16, or the absorbent material may be saturated with the liquid by inserting the end 24, the cap 27 being removed, into the liquid and by repeated compressions of the compressible member 19, liquid may be drawn into the absorbent material; or the elongated liquid-absorbent member may be withdrawn during the absorbing process as described above, may then be immersed in the liquid and replaced into the device.

Any convenient method may be employed for saturating all of the liquid-absorbent materials.

It will be noted that during the operation resulting in the spraying of the liquid through the opening 14 by means of repeated compressions of the compressible member 19, there is always a capillary contact between the liquid-absorbent materials 22, 22 and the liquid-absorbent material 26, and that, therefore, the forced passage of air through the liquid-absorbent member 26 will cause some of the liquid in the liquid-absorbent material 22 to enter the liquid-absorbent material 26 and thus charge it with liquid for the following forced passage of air therethrough.

It will be noted, also, that during the forced passage of air, it will draw not only upon the liquid in the liquid-absorbent material 26, but also upon the liquid in the liquid-absorbent material 22, 22, thus insuring a constant supply of liquid for spraying purposes.

Figure 2:
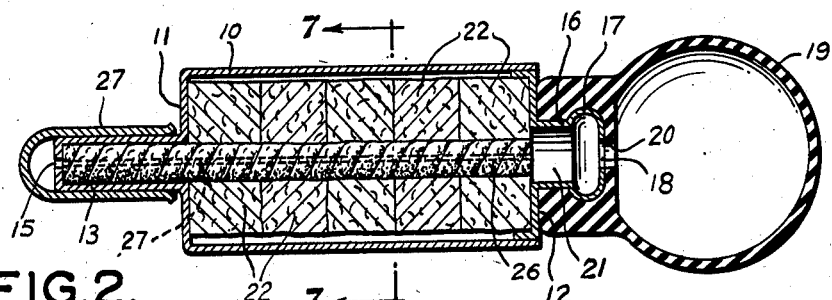
Figure 2 is a vertical longitudinal section of a modified form of a device of my invention.
Figure 7:
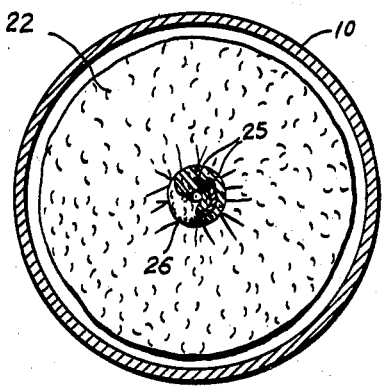
Figure 7 is a section through the line 7—7 of Figure 2.
Figure 8:
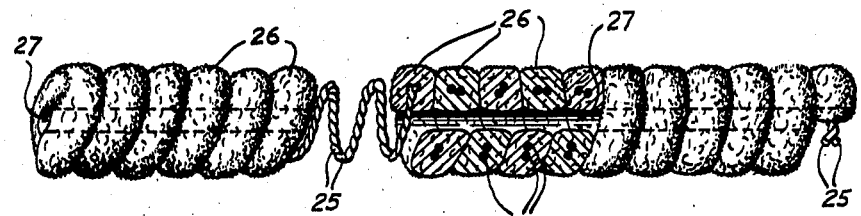
Figure 8 is a perspective view, broken away, of a modified form of a liquid-absorbent element of my device.

The modified form of my device shown in Figures 2, 7 and 8 is similar to that shown in Figures 1 and 6, except that the three strands of liquid-absorbent material is replaced by a single strand coiled as shown particularly in Figure 8, with a longitudinal opening 27 therethrough for the passage of air.

Figures 3, 4:
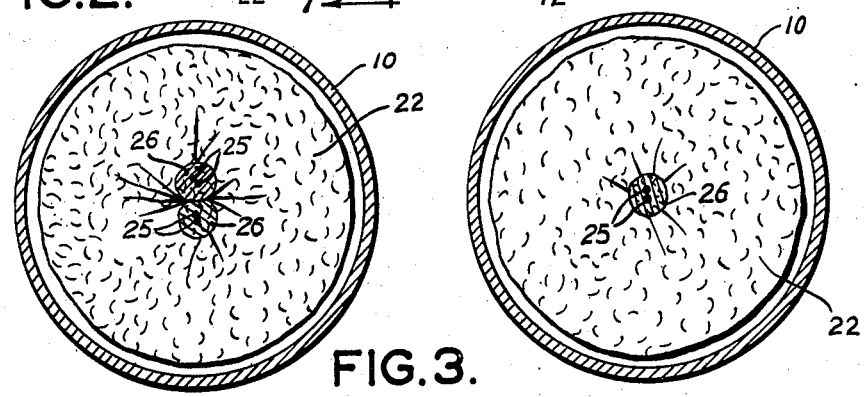
Figure 3 is a cross-section of a modified form of a device of my invention.
Figure 4 is a cross-section of a modified form of a device of my invention.

It is evident that any number of the liquid-absorbent strands may be employed and Figure 3 illustrates my device with two strands and Figure 4 illustrates a modification with one such strand.

Figure 9:
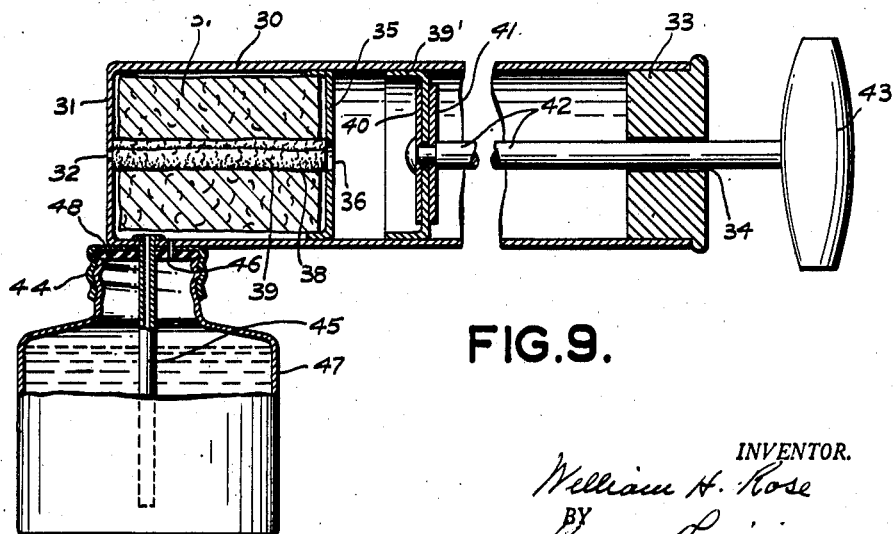
Figure 9 is a longitudinal vertical section of a modified form of a device of my invention.

Figure 9 illustrates a piston-operative device as a further modification comprising a casing having the side member 30, the end member 31 having an orifice 32, the other end of the casing being closed by the member 33 having a centrally positioned opening 34 therethrough.

The interior of the casing is separated into two compartments by the wall 35 having a centrally positioned opening 36 therein.

The forward compartment contains a liquid-absorbent material 37 having a centrally positioned passage 38 therein, within which is an elongated liquid-absorbent material 39 carried by strands as shown and described.

Within the rearward compartment is a plunger, or piston, comprising the member 39 of rubber, leather, fabric or other suitable material, having two metallic disks 40 and 41 upon opposite sides thereof and a rod 42 passing through centrally positioned openings in 39, 40 and 41 and extending through the opening 34 of the closure member 33, the exterior end of the rod 42 carrying the handle 43.

Positioned below the forward compartment and fixedly attached thereto is an interiorly threaded receptacle cap 44 having an opening through which a tube 45 extends outwardly from the interior of the forward compartment and an opening 46 also extends from the interior of the forward compartment through the cap 44.

It will thus be seen that a liquid receptacle 47 may be removably attached to the cap 44, with the tube 45 extending therein, and that a suitable gasket 48 may be employed.

This device may be employed to charge the absorbent material and to replenish the liquid to the absorbent material.

It is evident that the reciprocating movement of the plunger will cause repeated atomization of the liquid through the orifice 32.

It will, thus, be seen that one highly important advantage of the devices of my invention is that the reserve liquid-absorbent material may be packed to the extreme of compactness incident to containing the maximum of liquid, as the free flow of air and contained liquid toward the exit opening is not through this compacted material, while some air passes through this into the exit air passage, but through the elongated liquid-absorbent material, which is of such compactness, or looseness, as to accomplish the desired spraying result, while drawing upon the reserve supply of liquid to accomplish this result.

I do not limit myself to the particular size, shape, number, material, or arrangement of parts specifically mentioned, as these are given solely for the purpose of clearly describing my invention.

What I claim is:

1. A liquid spraying device comprising an exterior casing having an opening in one end thereof adapted for the introduction of air under pressure into said casing, and an opening at the other end thereof adapted for the emission of air from within said casing; a comparatively rigid member extending longitudinally within said casing and in alignment with said casing openings; a plurality of liquid-absorbent fibrous tufts carried by said rigid member, said tufts being spaced from the side wall of said casing, and liquid-absorbent material within said casing surrounding and in contact with said tufts.

2. A liquid spraying device comprising an exterior casing having an opening in one end thereof adapted for the introduction of air under pressure into said casing, and an opening at the other end thereof adapted for the emission of air from within said casing; at least one wire extending longitudinally within said casing and in alignment with said casing openings; loosely assembled liquid-absorbent material carried by said wires, said material being spaced from the side walls of said casing, and liquid-absorbent material within said casing surrounding and in contact with said material on said wire.

3. A liquid spraying device comprising an exterior casing having an opening adapted for the introduction of air under pressure into said casing, and an opening adapted for the emission of air from within said casing; a coiled comparatively rigid member extending longitudinally within said casing and in alignment with said casing openings; loosely assembled liquid-absorbent material carried by said rigid member, said material being spaced from the side wall of said casing, and liquid-absorbent material within said casing surrounding and in contact with said material on said rigid member.

4. A liquid spraying device comprising an exterior casing having an opening adapted for the introduction of air under pressure into said casing, and an opening adapted for the emission of air from within said casing; at least one coiled wire extending longitudinally within said casing and in alignment with said casing openings; loosely assembled liquid-absorbent material carried by said wires, said material being spaced from the side walls of said casing, and liquid-absorbent material within said casing surrounding and in contact with said material carried by said coiled wire.

5. A liquid spraying device comprising an exterior casing having an opening adapted for the introduction of air under pressure into said casing, and an opening adapted for the emission of air from within said casing; a loosely compacted mass of liquid-absorbent material within said casing lying along the longitudinal axis of and from end to end of said casing and in alignment with said casing openings and spaced from the side walls of said casing, and a more densely compacted mass of liquid-absorbent material surrounding said loosely compacted mass of absorbent material and in contact therewith.

6. A liquid spraying device comprising an exterior casing having a reduced extended end portion with an opening therein adapted for the introduction of air under pressure into said casing, and a reduced extended end portion with an opening therein adapted for the emission of air from within said casing; a comparatively rigid member extending longitudinally within said casing and within said extended emission end portion and in alignment with said casing openings; loosely assembled liquid-absorbent material carried by said rigid member, said material being spaced from the side walls of said enlarged portion of said casing and in contact with the side walls of said reduced emission portion of said casing, and other liquid-absorbent material within said casing surrounding said material in said larger portion of said casing and in contact with said material.

7. A liquid spraying device comprising an exterior casing having a reduced extended end portion with an opening therein adapted for the introduction of air under pressure into said casing, and a reduced extended end portion with an opening therein adapted for the emission of air from within said casing; at least one wire extending longitudinally within said casing and within said extended emission end portion and in alignment with said casing openings; a plurality of liquid-absorbent fibrous tufts carried by said wires, said tufts being spaced from the side walls of said enlarged portion of said casing and in contact with the side walls of said reduced emission portion of said casing, and liquid-absorbent material within said casing surrounding said tufts in said larger portion of said casing and in contact therewith.

8. A liquid spraying device comprising an exterior casing having a reduced extended portion with an opening therein adapted for the introduction of air under pressure into said casing, and a reduced extended end portion with an opening therein adapted for the emission of air from within said casing; a coiled comparatively rigid member extending longitudinally within said casing and within said extended emission end portion and in alignment with said casing openings; a plurality of liquid-absorbent fibrous tufts carried by said rigid member, said tufts being spaced from the side walls of said enlarged portion of said casing and in contact with the side walls of said reduced emission portion of said casing, and liquid-absorbent material within said casing surrounding said tufts in said larger portion of said casing and in contact with said tufts.

9. A liquid spraying device comprising an exterior casing having a reduced extended end portion with an opening therein adapted for the introduction of air under pressure into said casing, and a reduced extended end portion with an opening therein adapted for the emission of air from within said casing; at least one coiled wire extending longitudinally within said casing and within said extended emission end portion and in alignment with said casing openings; a plurality of liquid-absorbent fibrous tufts carried by said wires, said tufts being spaced from the side walls of said enlarged portion of said casing and in contact with the side walls of said reduced emission portion of said casing, and liquid-absorbent material within said casing surrounding said tufts in said larger portion of said casing and in contact therewith.

10. A liquid spraying device comprising an exterior casing having a reduced extended end portion with an opening therein adapted for the introduction of air under pressure into said casing, and a reduced extended end portion with an opening therein adapted for the emission of air from within said casing; a loosely compacted mass of liquid-absorbent material within said enlarged portion of said casing and within said extended emission portion of said casing and in alignment with said casing openings, said material being spaced from the side walls of said enlarged portion of said casing and in contact with the side walls of said extended emission portion thereof and a more densely compressed mass of liquid-absorbent material in the enlarged portion of said casing surrounding said loosely compacted mass of liquid-absorbent material and in contact therewith.

WILLIAM H. ROSE.